United States Patent [19]

Ogusu et al.

[11] Patent Number: 4,646,285

[45] Date of Patent: Feb. 24, 1987

[54] SHUTTER PLATE CONTROL DEVICE IN A DISC PLAYBACK DEVICE

[75] Inventors: Mikio Ogusu, Hamamatsu; Kazuo Urata; Takuya Tamaru, both of Hamakita; Yasuhiko Kamoshita, Hamamatsu, all of Japan

[73] Assignee: Nippon Gakki Seizo Kabushiki Kaisha, Hamamatsu, Japan

[21] Appl. No.: 781,751

[22] Filed: Sep. 30, 1985

[30] Foreign Application Priority Data

Oct. 3, 1984 [JP] Japan .................. 59-150100

[51] Int. Cl.⁴ .................. G11B 17/24; G11B 23/04
[52] U.S. Cl. .................. 369/291; 206/444; 360/97; 360/133; 369/77.2
[58] Field of Search .............. 369/291, 77.2; 206/444, 206/309, 312; 220/306; 360/133, 97, 99

[56] References Cited

U.S. PATENT DOCUMENTS

| 4,399,480 | 8/1983 | Edwards | 360/133 |
| 4,410,973 | 10/1983 | Saito et al. | 369/77.2 |
| 4,471,397 | 9/1984 | Cloutier | 360/133 |
| 4,525,758 | 6/1985 | Nakagawa et al. | 360/133 |
| 4,573,572 | 3/1986 | Kato et al. | 360/99 |

FOREIGN PATENT DOCUMENTS

| 2709944 | 9/1978 | Fed. Rep. of Germany | 360/133 |
| 2537320 | 6/1984 | France | 369/291 |

OTHER PUBLICATIONS

*Shutter Mechanism for Flexible Disk Cartridge*, IBM Technical Disclosure Bulletin, vol. 27, No. 1A, 6/84, pp. 40–41.

*Primary Examiner*—Steven L. Stephan
*Attorney, Agent, or Firm*—Spensley Horn Jubas & Lubitz

[57] ABSTRACT

A shutter plate control device in a disc playback device energizes a shutter plate in a disc magazine case with opening and closing members provided in a main body of the disc playback device. The opening member engages with a shutter lever provided on the shutter plate in loading of the disc magazine case to move the shutter plate in a direction for opening an aperture formed in the disc magazine case for exposing the disc to a pickup head to enable the pickup head to read date recorded on the disc. The closing member engages with the shutter lever in loading of the disc magazine case to be displaced by the shutter lever and thereby permit the shutter lever to pass by without moving the shutter plate while it engages with the shutter lever in ejecting of the disc magazine case to move the shutter plate in a direction for closing the aperture.

6 Claims, 28 Drawing Figures

SHUTTER PLATE CONTROL DEVICE IN A DISC PLAYBACK DEVICE

BACKGROUND OF THE INVENTION

This invention relates to a shutter plate control device in a disc playback device of a type in which a disc magazine case housing a disc is loaded in a main body and, more particularly, to a device capable of controlling a shutter plate provided for opening and closing a slot formed in the disc magazine case for exposing the disc to a pickup head.

In a disc playback device of a type in which a disc magazine case housing a disc is loaded in a main body of the device for playback of the disc, a slot is formed in the disc magazine case for exposing the disc housed in the disc magazine case to the outside and this slot faces a pickup head so as to enable data recorded on the disc to be read by the pickup head.

There is a prior art disc playback device using a disc magazine case including a shutter plate which opens and closes the slot for reading data. In taking out this disc magazine case from the main body of the device, this slot is closed by the shutter plate for preventing dust from entering the inside of the disc magazine case whereas during playback of the disc, the slot is opened to enable data on the disc to be read by the pickup head.

FIG. 17 shows the prior art disc playback device using the above described disc magazine case which is disclosed in the U.S. patent application No. 751,731 filed on July 3, 1985.

FIG. 17, reference character 1 designates a disc magazine case, 2 a disc housed in the disc magazine case and 3 a main body of the device. The disc magazine case 1 is formed in its bottom plate 4 with a laser beam slot 5 for reading data recorded on the disc, and on one side thereof with a rack 6 and is provided with a shutter plate 7 inside of the case. The shutter plate 7 is rotatable in the directions of arrows P1 and P2 about a pin 9 of a shutter lever 8 fixed to the shutter plate 7. In the illustrated state, the shutter plate 7 is closing the slot 5. When it is rotated in the direction of the arrow P1 to a position in which a slot 10 of the shutter plate 7 is in register with the slot 5, the slot 5 is opened. The shutter plate 7 normally closes the slot 5 by being urged in the direction of arrow P3 by a spring 11. The main body 3 comprises a loading device including a loading pinion 12 which can mesh with the rack 6 and an engaging portion 13 which is engageable with the tip portion of the shutter lever 8.

Operation of this device will be briefly described. When the disc magazine case 1 is inserted into the main body 3, the loading pinion 12 meshes with the rack 6 and thereafter the loading pinion 12 is rotated by the loading device causing the disc magazine case 1 to be moved in the direction of the arrow P3, i.e. towards the main body. In a later stage of this movement of the disc magazine case 1, the tip portion of the shutter lever 8 engages the engaging portion 13. By the loading operation, the shutter lever 8 is further pushed in the direction of the arrow P3 so that the shutter plate 7 is rotated in the direction of the arrow P1 against the force of the spring 11 thereby opening the slot 5. Upon being moved to a predetermined position, the disc magazine case 1 abuts against a stop 14 and ceases its movement in the direction of the arrow P3. The loading device, however, continues to supply a pulling force overcoming the force of the spring 11 to the rack 6 through the loading pinion 12 owing to operation of a slip clutch (not shown) provided in the loading device. In this state, the disc magazine case 1 is lowered and the disc 2 in the disc magazine case 1 is placed on a turntable (not shown).

Since this disc playback device is so constructed that the shutter plate 7 is rotated in the direction of the arrow P1 against the force of the spring 11 during loading of the disc magazine case 1, the shutter plate 7 can always be closed automatically by the force of the spring 11 except while the slot 5 needs to be opened. On the other hand, the urging force of the spring 11 constitutes a load to a drive source of the loading device during the loading operation with a result that the drive source must be of a large power. Further, this device requires the slip clutch in the loading device for maintaining the disc magazine case 1 to be pulled in the direction of the arrow P3 against the force of the spring 11 during the lowering of the disc magazine case 1 with a result that the construction of the main body 3 of the device becomes complicated. If the spring 11 is omitted from the disc magazine case 1, the slip clutch in the loading device in the main body will be obviated but in this case the structure for opening and closing the shutter plate 7 must be all provided on the side of the main body 3 and a complicated construction caused thereby is undesirable. Further, if the spring 11 is omitted, whether the shutter plate 7 is in the open state or closed state is quite uncertain when the disc magazine case 1 is inserted into the main body. The device will therefore require construction which will ensure a smooth loading operation regardless of the state of the shutter plate 7 and an accurate opening and closing operation of the shutter plate 7.

It is, therefore, an object of the invention to provide a shutter plate control device in a disc playback device capable of reducing load applied to the drive source of the loading device.

It is another object of the invention to provide a shutter plate control device with a simplified construction of the main body of the disc playback device.

It is still another object of the invention to provide a shutter plate control device capable of accurately controlling the operation of the shutter plate during the loading operation regardless of the state of the shutter plate.

SUMMARY OF THE INVENTION

For achieving these objects, the shutter plate control device according to the invention comprises means for forming an aperture in a disc magazine case for exposing a disc housed in the disc magazine case to a pickup head, a shutter plate provided in the disc magazine case for opening and closing this aperture, a shutter lever provided on the shutter plate, an opening member provided in the main body and engaging with the shutter lever in loading of the disc magazine case to move the shutter plate in a direction for opening the aperture, and a closing member provided in the main body and engaging with the shutter lever in loading of the disc magazine case to be displaced by the shutter lever and thereby permit the shutter lever to pass by without moving the shutter plate while engaging with the shutter lever in ejecting of the disc magazine case to move the shutter plate in a direction for closing the aperture.

According to the invention, opening and closing of the shutter plate during loading and ejecting can be realized without requiring any means provided on the disc magazine case for urging the shutter plate and, accordingly, a load applied to the drive source during loading is reduced and the arrangement provided on the main body side for coping with the urging force exercised by the urging means is obviated with resulting simplification of the construction of the device. Further, if the shutter plate is opened in the initial stage of loading and the shutter lever is located in a position which is different from an expected one, the shutter lever is permitted to displace without causing any trouble so that the device can overcome the problem of uncertainty caused by omission of the urging means for the shutter plate and always realize an accurate opening and closing operation of the shutter plate.

BRIEF DESCRIPTION OF THE DRAWINGS

In the accompanying drawings,

FIGS. 1 through 16 are views showing an embodiment of the present invention in which:

FIG. 1 is a plan view of the disc playback device;

FIG. 2 is a side elevation of the same device;

FIG. 3 is a bottom view of the same device;

FIG. 4 is an exploded perspective view of the same device;

FIG. 5 is a plan view of a holder;

FIG. 6 is a plan view of a head base;

FIG. 7 is a rear view of the head base;

FIG. 8 is an enlarged view of a portion indicated by reference character S in FIG. 6;

FIG. 9 is a perspective view of the disc magazine case in its closed state;

FIG. 10 is a perspective view of the disc magazine case in its opened state;

FIG. 11 is an exploded perspective view of the disc magazine case;

FIGS. 12a through 12c, FIG. 13, FIGS. 14a through 14f, FIGS. 15a through 15d and FIGS. 16a and 16b are views for showing the operation of the disc playback device.

DESCRIPTION OF PREFERRED EMBODIMENT

FIGS. 1 through 16 show an embodiment of the present invention applied to a Compact Disc player.

A disc playback device (Compact Disc player) to be described below comprises a disc magazine case 40 for housing a disc such as a Compact Disc and a main body 41 of the device. The disc magazine case 40 in which a disc is exchangeably received is loaded in the main body 41 and the disc is played in a state in which it is received in the case 40.

Figure 9:
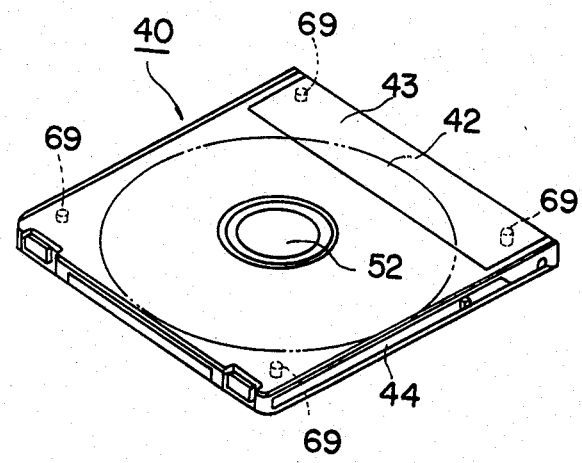
Figure 10:
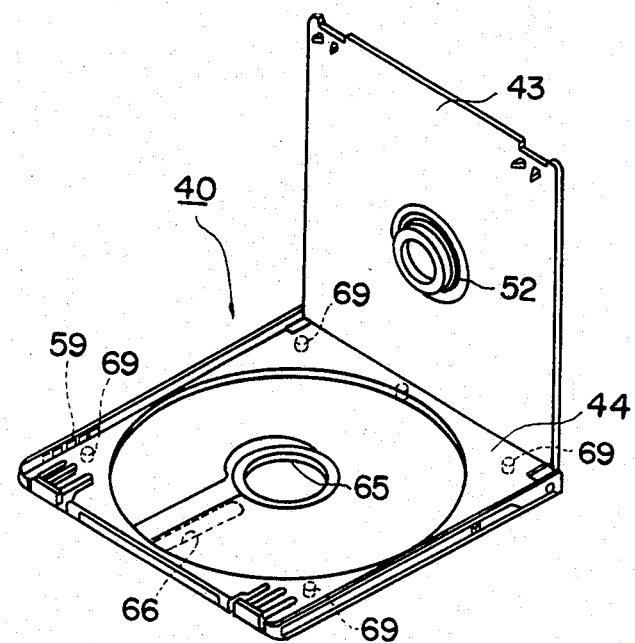
Figure 11:
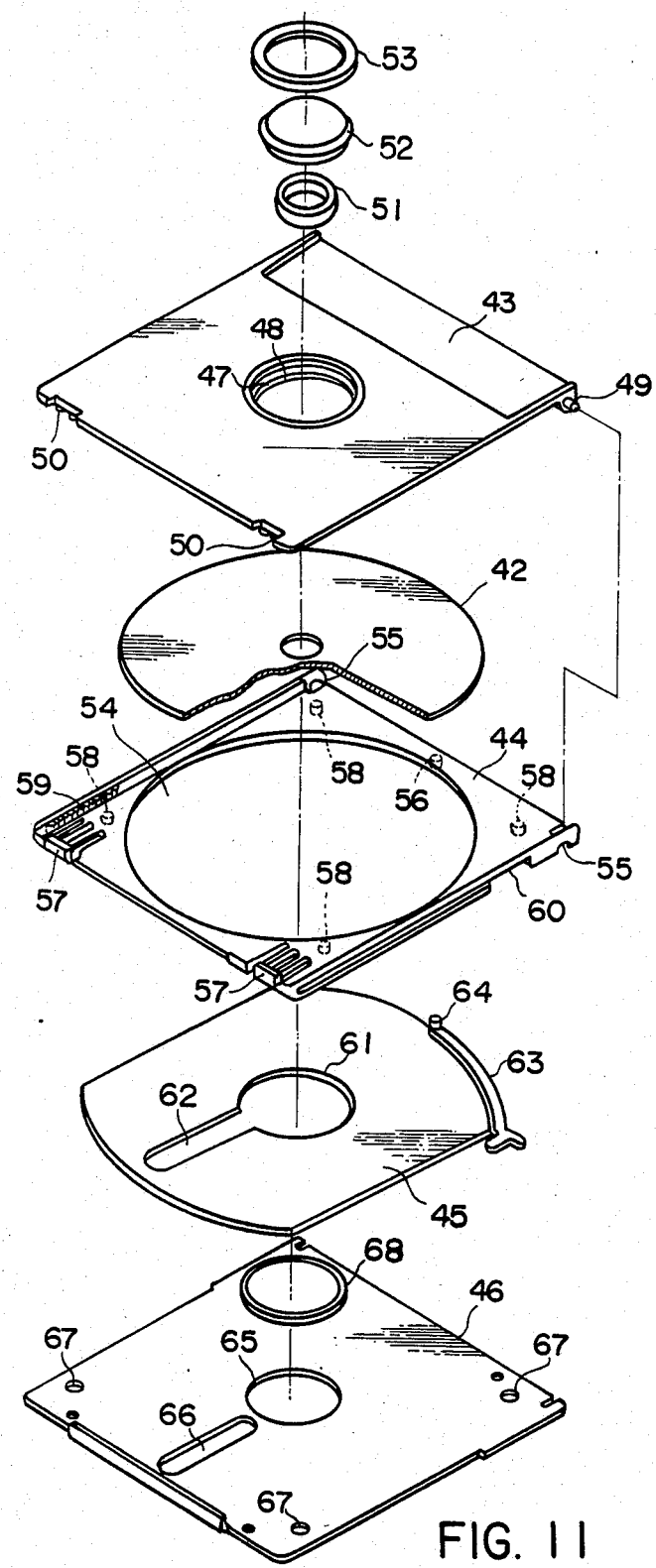

Construction of the disc magazine case 40 will first be described with reference to FIGS. 9–11. As shown in the figures, the disc magazine case 40 is of a plate-like configuration, oblong in its plan view and having a certain thickness in its closed state housing a disc 42. This disc magazine case 40 comprises, as its main component parts, a lid 43, a magazine frame 44, a shutter plate 45 and a magazine plate 46.

The lid 43 is formed in its central portion with an opening 48 in which a stepped portion 47 is formed. The lid 43 is also formed in its rear end portion with pins 49, 49 and in its front end portion with engaging projections 50, 50. In the opening 48, there is disposed a stabilizer (subclamper) 52. A sponge 51 is fixedly secured on the lower surface of the stabilizer 52. The stabilizer 52 is held between the stepped portion 47 and a ring 53 fixedly secured to the lid 43 and is rotatable in the opening 48. The magazine frame 44 is formed in its central portion with a disc locating opening 54, in its rear end portion with engaging recesses 55, 55 and a holding hole 56, in its front end portion with engaging portions 57, 57, in respective corners of its lower surface with location pin holes 58, 58 . . . , on one side thereof with a rack 59 and on the other side thereof with a recessed portion 60. A shutter plate 45 is formed in its central portion with an opening 61 and a slot 62 continuous with the opening 61. A shutter lever 63 is fixedly secured at the rear end portion of the shutter plate 45. The shutter lever 63 has a pin 64 provided at the base portion thereof. The magazine plate is formed in its central portion with a turntable opening 65, in its front end portion with a laser beam slot 66 and in each corner with location pin holes 67, 67 . . . A ring 68 is fixedly secured on the upper surface of the peripheral portion of the turntable opening 65.

The lid 43 is attached to the magazine frame 44 with the pins 49, 49 being engaged in the engaging openings 55, 55. The shutter plate 45 is disposed below the magazine frame 44 in such a manner that the pin 64 of the shutter lever 63 is inserted in the holding hole 56 and the tip of the shutter lever 63 is projecting out of the recessed portion 60. By fixing the magazine plate 46 to the lower surface of the magazine frame 44, the shutter plate 45 is held between the magazine plate 46 and the magazine frame 44.

Due to the above described construction, the lid 43 can pivot about the pins 49, 49 so as to open and close the disc locating opening 54 in which the disc 42 is received. When the lid 43 is closed, the engaging projections 50, 50 engage with the engaging portions 57, 57 so that unexpected opening of the lid 43 is prevented. The shutter plate 45 is rotatable about the pin 64 in the direction of arrows P5, P6 by operating the tip portion of the shutter lever 63 and the laser beam slot 66 can be opened and closed by bringing the slot 62 in and out of register with the laser beam slot 66. The location pin holes 58 formed in the respective corners of the magazine frame 44 are in register with their corresponding location pin holes 67 formed in the respective corners of the magazine plate 46. These location pin holes constitute a location pin insertion portion 69 (i.e., a positioning portion).

Figure 1:
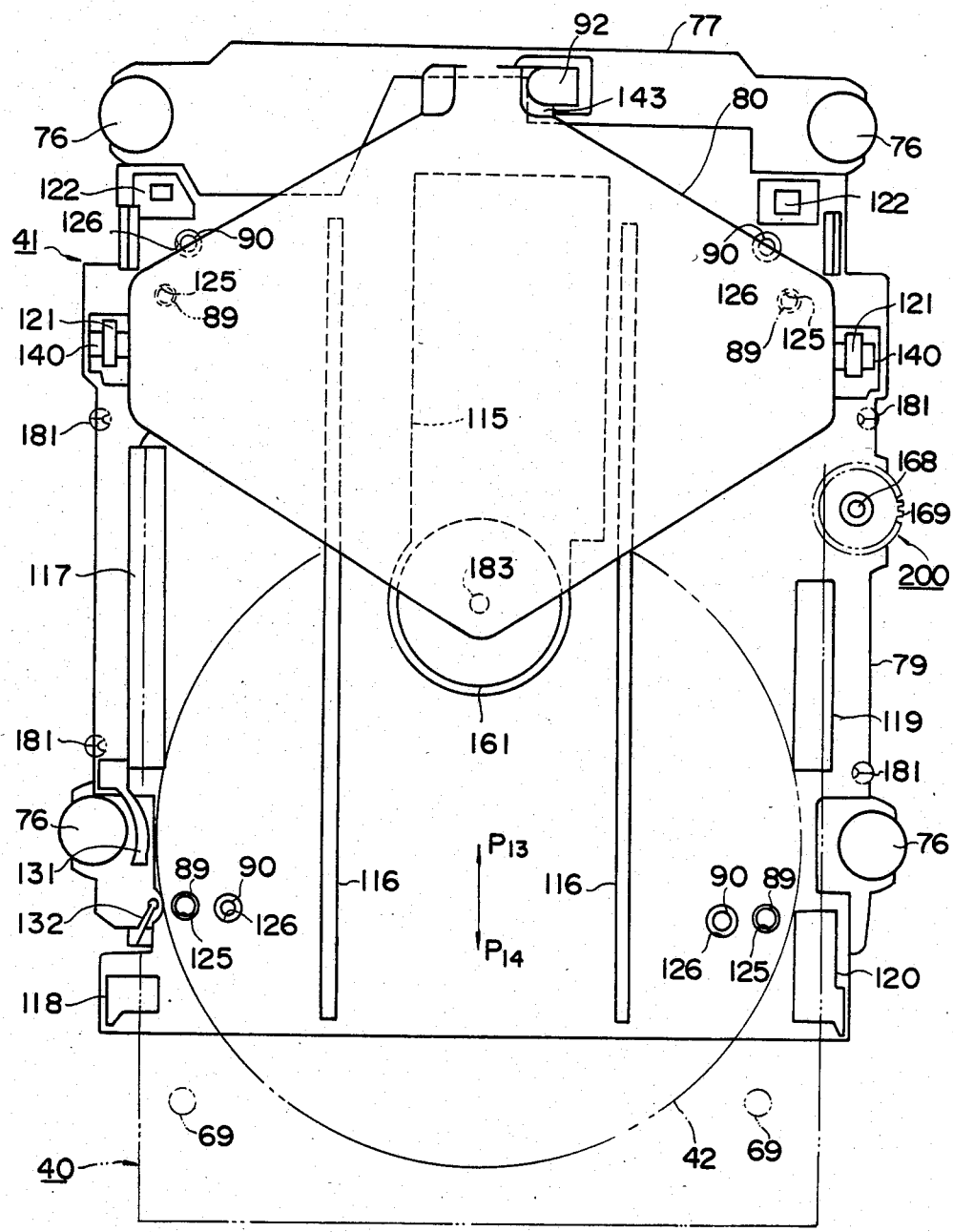
Figure 2:
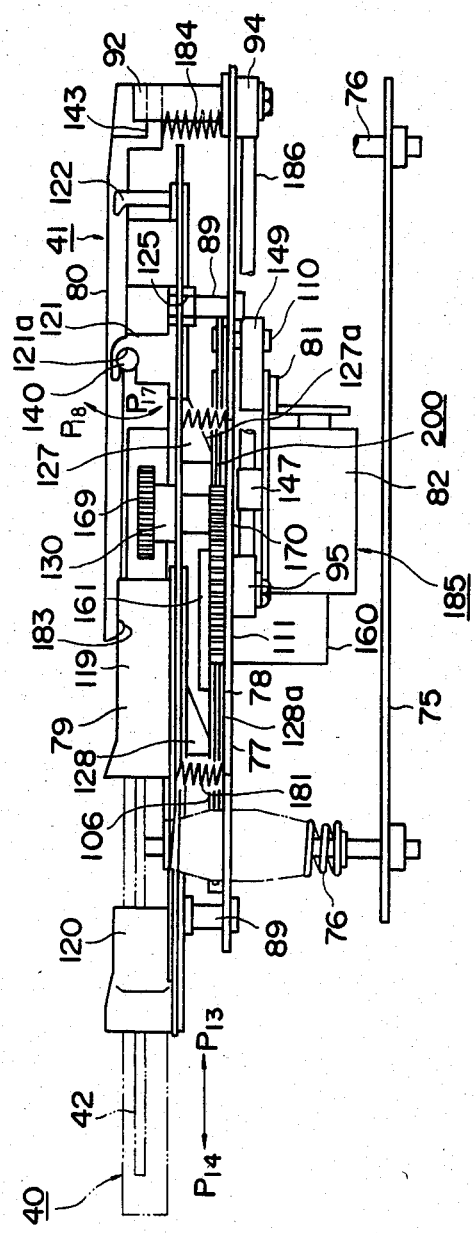

The construction of a main body 41 of the device will now be described with reference to FIGS. 1 through 8. In FIG. 2, reference numeral 75 designates a bottom plate of an outer case. A chassis 77 is mounted on the bottom plate 75 by means of suspension mechanisms 76, 76 . . . As shown in FIGS. 1 through 4, a carrier 78, a holder 79 and a clamper 80 are provided on the chassis 77 and a head base 81 and an optical pickup head 82 are provided under the chassis 77.

Figure 4:
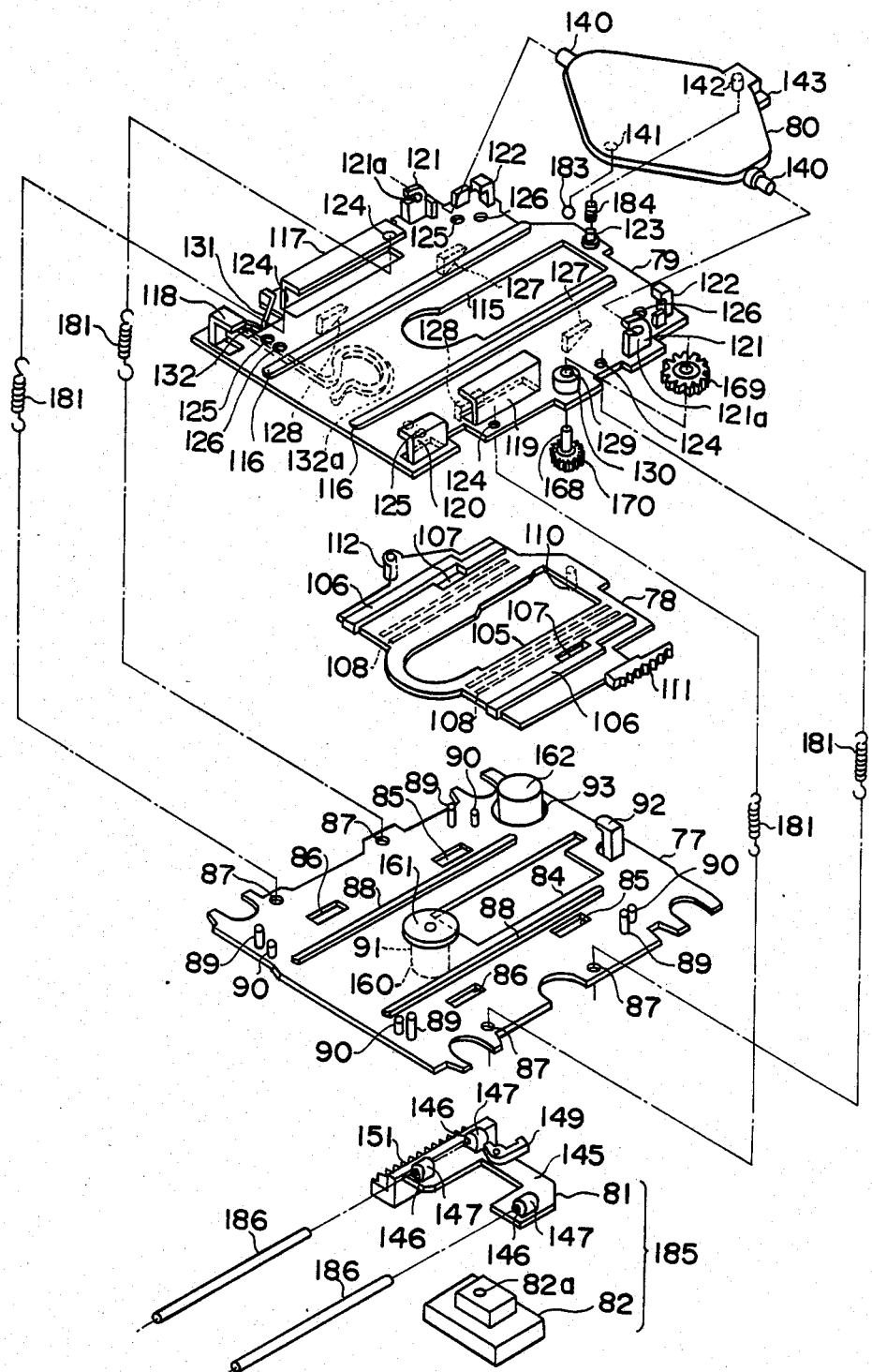
Figure 5:
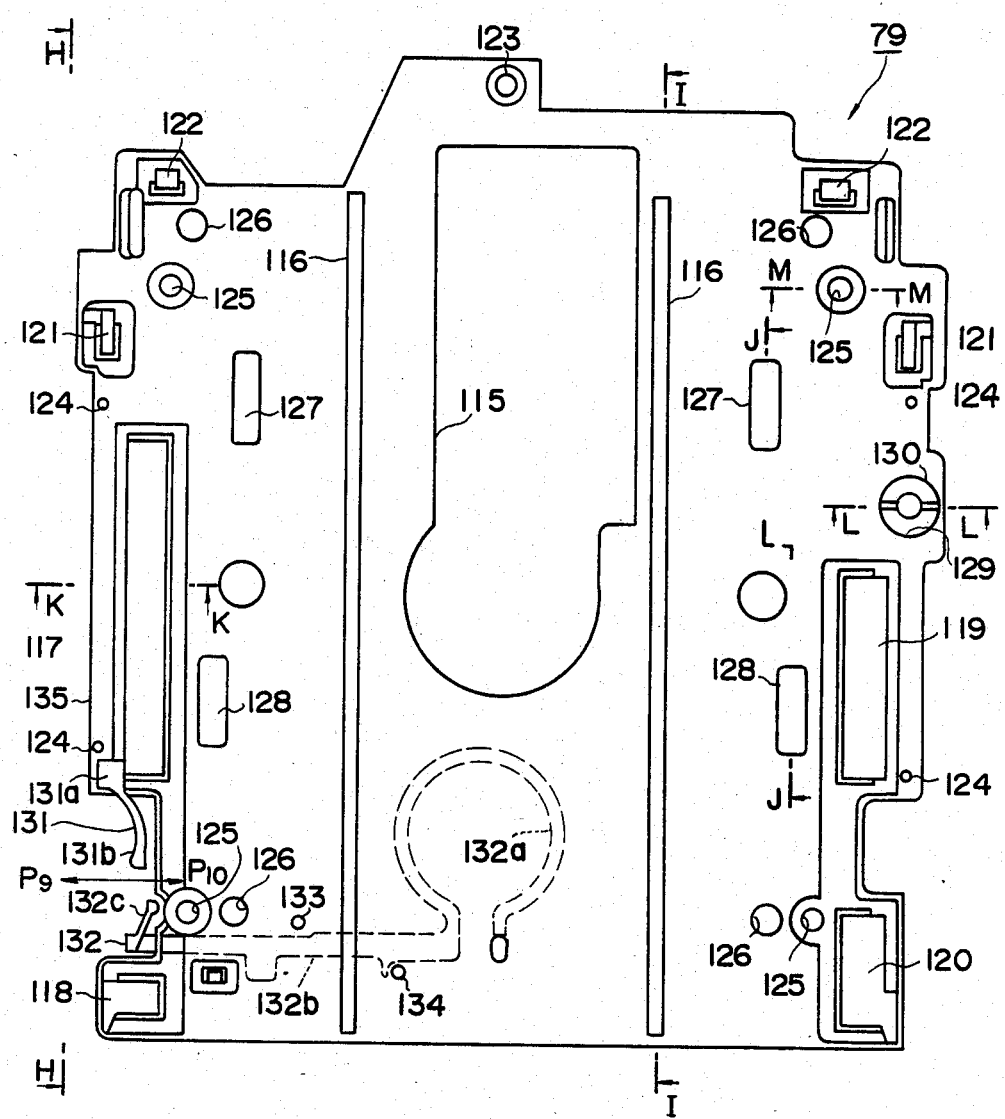

The chassis 77 is of an oblong plate-like configuration as shown in FIG. 4. The chassis 77 is made by pressing a metal plate into a predetermined shape and thereafter forming projections of synthetic resin and openings by outserting forming process. The carrier 78 and holder 79 are formed in the same manner. The chassis 77 is formed in its rear portion with an opening 84, in its left and right portions with cam receiving slots 85, 85, 86, 86 and connection spring holes 87, 87 . . . , on its left and right upper surfaces with rails 88 and 88 extending in the longitudinal direction of the chassis 77, in each corner of its upper surface with location pins 89, 89 . . .

and lowermost position restricting pins 90, 90 ..., in its central protion with a disc driving motor securing portion 91, in its near portion with an upwordly projecting camper stop 92 and a feed loading motro securing portion 93, on its lower surface on both sides of the opening 84 with guide bar securing portions 49, 94, 95, 95 and on its lower surface on one side of the opening 84 with an actuator 97 rotatable in the direction indicated by arrows P7 and P8 about an axis 96 and engaging pins 98 and 99.

The carrier 78 is formed in its central portion with an opening 105, on its upper surface on both sides of the opening 105 with cam engaging plates 106, 106, adjacent to the central portions of the cam engaging plates 106, 106 with cam engaging slots 107, 107, in its lower surface portion on both sides of the opening 105 with projections 109, 109 to form grooves 108, 108 extending in the moving direction of the disc magazine case 40, in the rear end portion of its lower surface with a carrier pin 110, in the rear portion of its one side portion with a carrier rack 111 and on the lower surface of the other side with an engaging pin 112.

The holder 79 is made of an oblong plate formed with projections and openings. The holder 79 is formed in its rear portion with an opening 115, on its upper surface on both sides of the opening 115 with rails 116, 116 extending in the moving direction of the disc magazine case 40, on the upper surface of its left and right portions with guide walls 117–120, on the upper surface of its rear end portion with clamper support walls 121, 121 having openings 121a, 121a, case stops 122, 122 and a pin 123, on its both side portions with connection spring holes 124, 124 ..., in each corner thereof with location pin guide holes 125, 125 ... and lowermost position restricting pin holes 126, 126 ..., on the lower surface of its left and right portions with cams 127, 127, 128, 128 and i.e., projections respectively having a tapered lower surface, and on one side portion thereof with a pinion securing portion 130 having an opening 129. On one side of the front end portion of the holder 79 are provided an opening hook 131 (opening member), a closing hook 132 (closing member), pins 133 and 134. The opening-hook 131 consists of a fixing portion 131a secured fixedly to a plate portion 135 and an engaging portion 131b extending forwardly from the fixing portion 131a. The engaging portion 131b can elastically deform in the direction of arrows P9, P10. The closing hook 132 consists of a curved portion 132a disposed on the lower surface of the plate portion 135 and fixed in one end portion thereof to the plate portion 135, a linear portion 132b extending laterally along the lower surface of the plate portion 135 from the other end of the curved portion 132a with its tip portion projecting outwardly from the side edge of the plate portion 135, and an engaging portion 132c extending obliquely rearwardly from the tip of the linear portion 132b towards the plate portion 135 and being located above the plate portion 135 with the opening hook 131. The closing hook 132 can move in the direction of arrows P9, P10 by elastic deformation of the curved portion 132a caused by engagement of the engaging portion 132c. The linear portion 132b constantly moves along a predetermined course being guided by the pin 133 when it is moved with the engaging portion 132c in the direction of the arrows P9, P10. The engaging portion 132c is previously pulled slightly in the direction of the arrow P9 to be deflected so that a projection formed in the linear portion 132b is engaged with a pin 134 provided on the plate portion 135.

The cams 127, 127, 128, 128 are formed on the lower surfaces thereof with cam surfaces 127a, 127a, 128a, 128a inclining forwardly downwardly.

The clamper 80 is generally of a diamond shape and is formed on both sides thereof with pins 140, 140, in its foremost end portion with a recess 141, on its rear lower surface with a pin 142 and on the left and right sides of the pin 142 with engaging walls 143.

Figure 6:
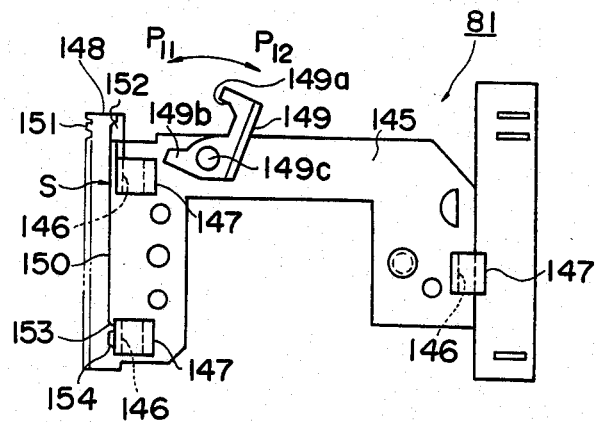
Figure 7:
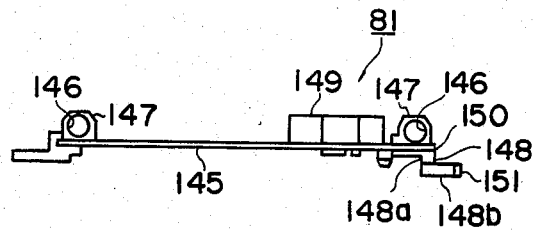
Figure 8:
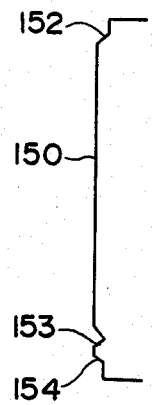

The head base 81 is shown in detail in FIGS. 6, 7 and 8. As shown in these figures, a plate portion 145 of the head base 81 is formed in its both side portions with guide portions 147, 147, 147 having guide holes 146, 146, 146 and in its one side portion with a wall portion 148 extending in the moving direction of the disc magazine case 40. An engaging hook 149 is pivotably mounted on the upper surface of one side portion of the head base 81. The wall portion 148 consists of a downwardly projecting vertical portion 148a and a horizontal portion 148b projecting laterally outwardly from the lower end of the vertical portion 148a. On the outside surface of the vertical portion 148a is formed a cam 150 and on the outside surface of the horizontal portion 148b is formed a feed loading rack 151. The cam 150 has, as shown in FIGS. 7 and 8, read-in position detection recess 152, a read-out position detection recess 153 and an overstroke position detection recess 154 on a flat wall surface. The engaging hook 149 has a hook portion 149a, an engaging portion 149b and a pin 149c. The pin 149c is mounted on the plate portion 145 rotatably in the direction of arrows P11 and P12.

Figure 3:
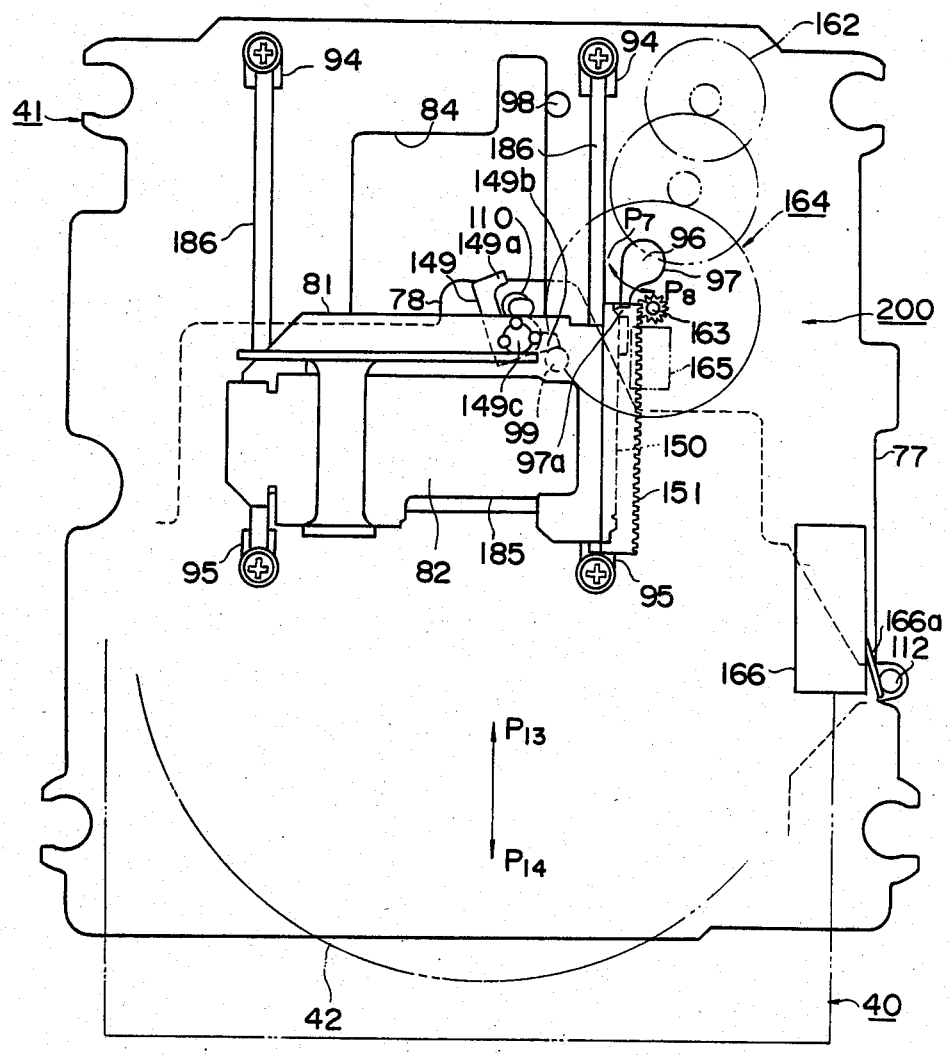

As shown in FIGS. 1 through 4, to the disc driving motor securing portion 91 under the chassis 77 is secured a disc driving motor 160 and to the rotation shaft of the disc driving motor 160 projecting above the chassis 77 is secured a turntable 161. To the feed loading motor securing portion 93 is secured a feed loading motor 162. Further, as shown in FIG. 3, to the lower surface of the chassis 77 are secured a feed loading pinion 163, gear train 164 transmitting a rotational force of the motor 162 to the pinion 163, a head position detection switch 165 whose circuit is switched when the actuator 97 is operated and a disc magazine case detection switch 166. An operation lever (not shown) of the head position detection switch 165 constantly urges the engaging portion 97a of the actuator 97 in the direction of the arrow P7.

The carrier 78 is mounted on the chassis 77 with the rails 88, 88 of the chassis 77 being engaged in the grooves 108, 108 formed in the lower surface portion of the carrier 78. In this state, the carrier pin 110 is projecting downwardly of the chassis 77 through the opening 84. The engaging pin 112 is projecting downwardly of the chassis 77 from the side portion of the chassis 77 so as to abut against an actuator 166a of the disc magazine case detection switch 166. The turntable 161 is projecting upwardly from the carrier 78 through the opening 105. The carrier 78 is displaceable in the direction of arrows P13 and P14 being guided along the rails 88, 88 in the state in which the carrier 78 is mounted on the chassis 77 in the above described manner.

The pin 168 is rotatably inserted in the opening 129 of the pinion securing portion 130 of the holder 79. To the upper end portion of the pin 168 projecting above the pinion securing portion 130 is secured a loading pinion 169 and to the lower end portion of the pinion securing portion 130 of the pin 168 is secured a carrier pinion 170.

The loading pinion 169 is adapted to mesh with the rack 59 of the disc magazine case 40 when the disc magazine case 40 is inserted in the holder 79 as will be described later.

In the state in which the location pins 89, 89 . . . of the chassis 77 are inserted in the location pin guide holes 125, 125 . . . and the carrier 78 is disposed between the chassis 77 and the holder 79, the holder 79 on which the loading pinion 169 and the carrier pinion 170 are mounted is supported vertically movably on the chassis 77. The lower ends of the cams 127, 127, 128, 128 are in abutting engagement with the upper surfaces of the cam engaging plates 106, 106 in the non-playback mode. The carrier pinion 170 is in mesh with the carrier rack 111 of the carrier 78. The lowermost position restricting pins 90, 90 . . . are disposed beneath the lowermost position restricting pin holes 126, 126 . . . Connection springs 181, 181 . . . are provided between the connection spring holes 124, 124 . . . of the holder 79 and the connection spring holes 87, 87 . . . of the chassis 77. In this construction, the holder 79 is constantly urged downwardly to the chassis 77.

A steel ball 183 is fittedly received in the recess 141 formed in the foremost end portion of the clamper 80. The clamper 80 is attached to the holder 79 with the pins 140, 140 being engaged in the openings 121a, 121a of the clamper support walls 121, 121. The clamper 80 is rotatable about the pins 140, 140 in the direction of arrows P17 and P18 but its scope of rotation is limited to a position in which the engaging wall 143 abuts against the clamper stop 92 of the chassis 77. A spring 184 is provided between the pin 142 of the clamper 80 and the pin 123 of the holder 79 so that the clamper 80 is constantly urged in the direction of the arrow P17.

On the head base 81 is mounted the optical pickup head 82 with its signal reading portion 82a (FIG. 4) facing upward. The head base 81 and the pickup head 82 constitute a head device 185. This head device 185 is mounted on the lower surface of the chassis 77 as shown in FIGS. 2, 3 and 4. More specifically, guide bars 186, 186 are supported between the guide bar securing portions 94, 94 and 95, 95 formed on the lower surface of the chassis 77. The head base 81 is mounted on the guide bars 186, 186 with the guide bars 186, 186 being engaged in the guide openings 146, 146 of the guide portions 147, 147. In this state, the head device 185 is displaceable in the direction of arrows P13 and P14 being guided along the guide bars 186, 186. The feed loading rack 151 of the head base 81 is in meshing engagement with the feed loading pinion 163. The engaging portion 97a of the actuator 97 is in abutting engagement with the cam 150 of the head base 81. The engaging portion 149b of the engaging hook 149 is located between the engaging pins 98 and 99 formed on the chassis 77. The rear edge of the head base 81 can abut against the carrier pin 110 of the carrier 78 and the hook portion 149a of the engaging hook 149 can engage with the carrier pin 110.

In the above described construction, the feed loading motor 162, gear train 164, head device 185, carrier 78, carrier pinion 170 and loading pinion 169 constitute a loading device 200 for carrying out loading and ejecting of the disc magazine case 40 as will be described later.

Operations of the above described embodiment of the disc playback device will now be described with reference to FIGS. 1 through 3 and 9 through 16.

Figure 12A:
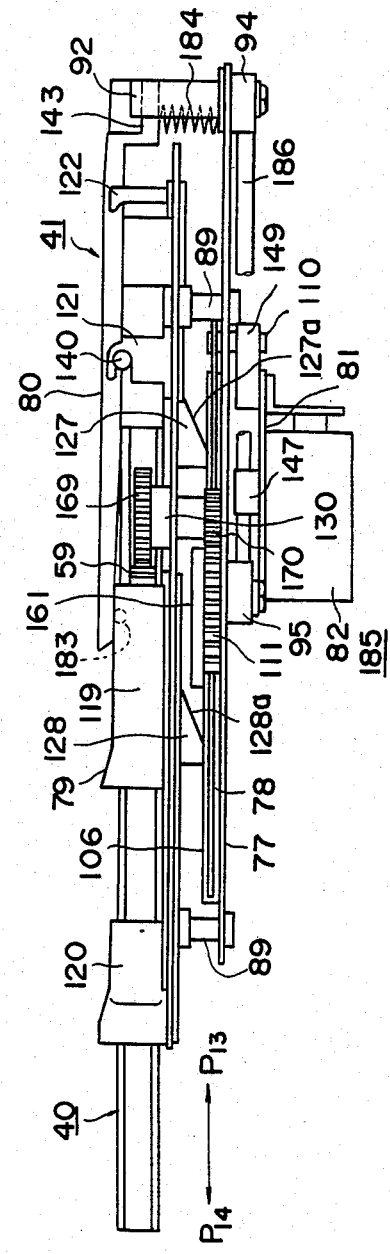
Figure 12B:
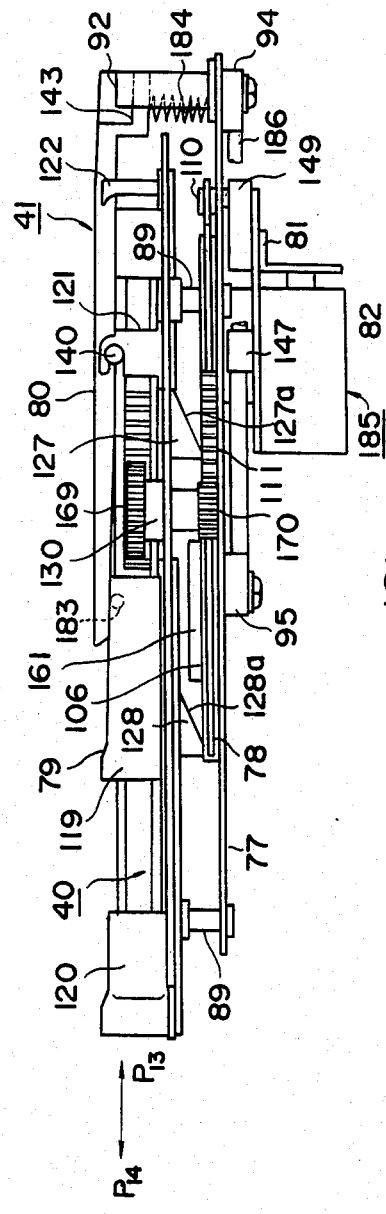
Figure 14A:
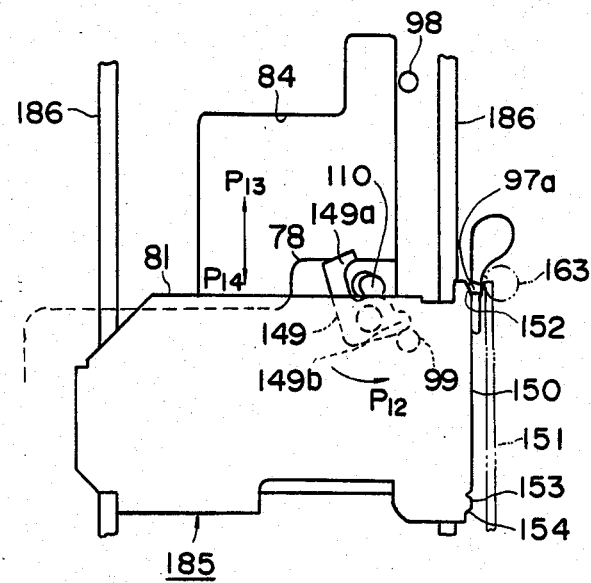

In a state before the disc magazine case 40 is inserted, the main body 41 of the device is in a state shown in FIG. 12a, i.e., the carrier 78 is in a position displaced in the direction of the arrow P14 and the holder 79 and the clamper 80 are in an elevated state with the lower ends of the cams 127, 127, 128, 128 being in abutting engagement with the upper surfaces of the cam engaging plates 106, 106 of the carrier 78. The head device 185 is in a position in which it is displaced in the direction of the arrow P14 as shown in FIG. 14a with the engaging portion 149b of the engaging hook 149 abutting against the engaging pin 99 and the hook portion 149a of the engaging hook 149 being disengaged from the carrier pin 110 of the carrier 78. The engaging portion 97a of the actuator 97 is engaged in the read-in position detection recess 152 of the cam 150. The engaging pin 112 of the carrier 78 is in abutting engagement with the actuator 166a of the disc magazine case detection switch 166 as shown in FIG. 3. The carrier pinion 170 is meshed with the carrier rack 111.

For performing playback of the disc 42, the disc 42 is placed in the disc locating opening 54 of the disc magazine case 40, the disc magazine case 40 is closed and then the disc magazine case 40 is inserted manually into the holder 79 from the front end of the main body 41. At this time, the laser beam slot 66 of the disc magazine case 40 is closed by the shutter plate 45. The disc magazine case 40 thereupon is moved in the direction of the arrow P13 being guided along the guide walls 117–120 and the rails 116, 116, and the rack 59 of the case 40 comes into meshing engagement with the loading pinion 169 when the disc magazine case 40 has been inserted into the holder 79 by a predetermined distance.

The operator of the disc magazine case 40 releases the disc magazine case 40 when the loading pinion 169 has been rotated slightly upon its meshing with the rack 59. As the loading pinion 169 is rotated, this rotation is transmitted to the carrier pinion 170 through the pin 168 so that the carrier rack 111 which is in mesh with carrier pinion 170 is moved in the direction of the arrow P13 and the carrier 78 is thereby moved slightly in the same direction. Thereupon the engaging pin 112 is disengaged from the actuator 166a of the disc magazine case detection switch 166 shown in FIG. 3 thereby turning the switch 166 on.

Figure 14B:
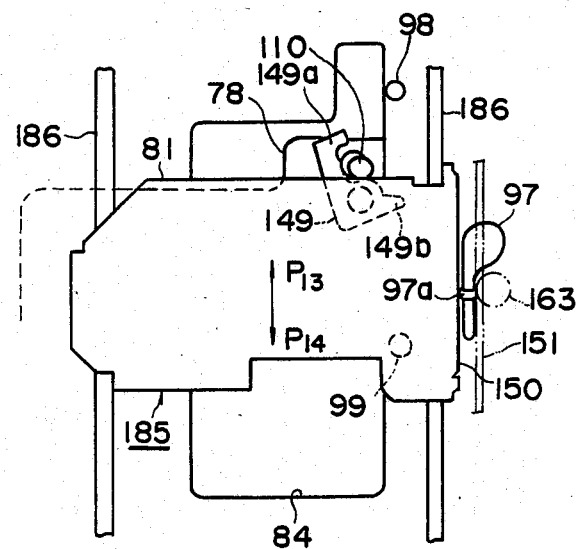

Upon turning on of the switch 166, the feed loading motor 162 is turned on by operation of a control circuit (not shown) and the rotation of this motor 162 is transmitted to the feed loading pinion 163 through the gear train 164. The feed loading rack 151 which is in mesh with the pinion 163 is moved in the direction of the arrow P13 and the head device 185 is thereby moved in the same direction. The movement of the head device 185 in this direction causes the rear edge of the head base 81 to abut against the carrier pin 110 and push the carrier pin 110 in the direction of the arrow P13 as shown in FIG. 14b thereby moving the carrier 78 in the same direction. At this time, the engaging portion 97a of the actuator 97 is in sliding engagement with the flat surface of the cam 150. The cams 127, 127, 128, 128 of the holder 79 slide over the cam engaging plates 106, 106 of the carrier 78. As the carrier 78 moves in the direction of the arrow P13, the carrier pinion 170 which is meshed with the carrier rack 111 is rotated which in turn causes the loading pinion 169 to rotate. The disc magazine case 40 whose rack 59 is meshed with this loading pinion 169 is moved in the direction of the arrow P13 towards the inside of the holder 79 as shown in FIG. 37b. During this movement, the laser beam slot 66 is opened by rotation of the shutter plate 45. This operation will be described more fully later. Upon reaching of the disc magazine case 40, carrier 78 and the head device 185 to a predetermined position in the direction of the arrow P13, as shown in FIG. 13c the cam surfaces 127a, 127a of the holder 79 gradually enter the cam engaging slots 107, 107 of the carrier 78 and the cam receiving slots 85, 85 of the chassis 77 whereas the cam surfaces 128a, 128a gradually enter the cam receiving slots 86, 86 of the chassis 77, moving downwardly from the front edge of the cam engaging plates 106, 106. In this manner, the holder 79 and the clamper 80 supported on the holder 79 are gradually lowered to the lowermost position shown in FIG. 12c whereupon the loading operation of the disc magazine case 40 is completed.

In this operation, the location pin holes 69 formed in the disc magazine case 40 are located above the location pins 89, 89 . . . formed on the chassis 77 when the disc magazine case 40 has reached a predetermined position. As the holder 79 is lowered, the location pins 89, 89 . . . enter the location pin holes 69, 69 . . . guiding the downward movement of the disc magazine case 40 smoothly to its lowermost position. Also, the downward movement of the holder 79 causes the lowermost position restricting pins 90, 90 . . . formed on the chassis 77 to enter the lowermost position restricting pin holes 126, 126 . . . and project above the upper surface of the holder 79 and abut against the lower surface of the disc magazine case 40 thereby defining the lowermost position of the disc magazine case 40. The position in the horizontal direction at which the disc magazine case 40 starts its downward movement is determined by the constructions of the cams 127, 127 of the holder 79, the cam receiving slots 85, 85 and of the chassis 77 and the front edges of the cam engaging plates 106, 106 of the carrier 78. For preventing excessive rearward movement of the disc magazine case 40 in the direction of the arrow P13 for any unexpected reason, case stops 122, 122 are formed on the holder 79. These case stops 122, 122 are formed in such a manner that they are normally opposed to the innermost edge of the disc magazine case 40 with a small distance therebetween.

As the holder 79 is lowered, the turntable 161 located on the upper surface of the chassis 77 projects above the holder 79 through the opening 105 of the carrier 78 and the opening 115 of the holder 79 and enters the turntable opening 65 of the disc magazine case 40 and abuts against the lower surface of the disc 42. In the meanwhile, as the clamper 80 is lowered with the holder 79, the steel ball 183 attached on the front end portion of the clamper 80 abuts against the stabilizer 52 of the disc magazine case 40. The steel ball 183 pushes the stabilizer 52 downwardly by the force of the spring 184 so that the stabilizer 52 abuts against the upper surface of the disc 42. Accordingly, the disc 42 is held between the turntable 161 and the stabilizer 152 thereby being maintained in a playable state.

Figure 12C:
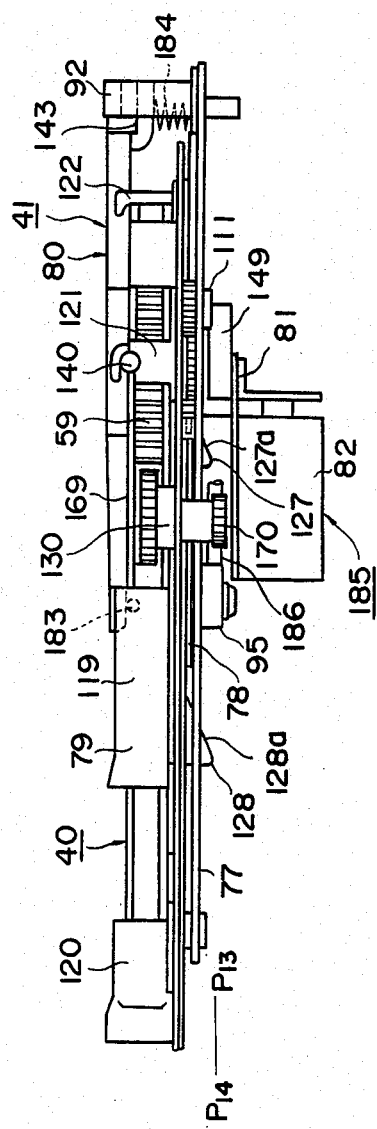
Figure 13:
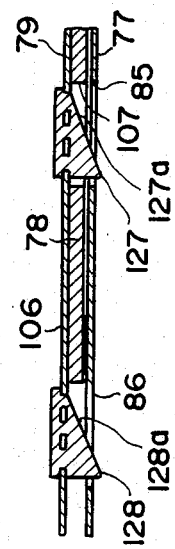

When the holder 79 has reached its lowermost position shown in FIG. 12c, the carrier pinion 170 secured on the holder 79 is disengaged from the carrier rack 111 and is located below the carrier rack 111.

Figure 14C:
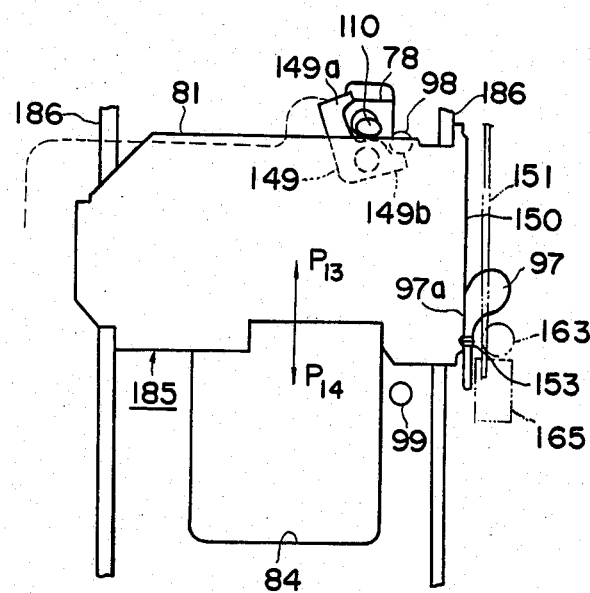
Figure 14D:
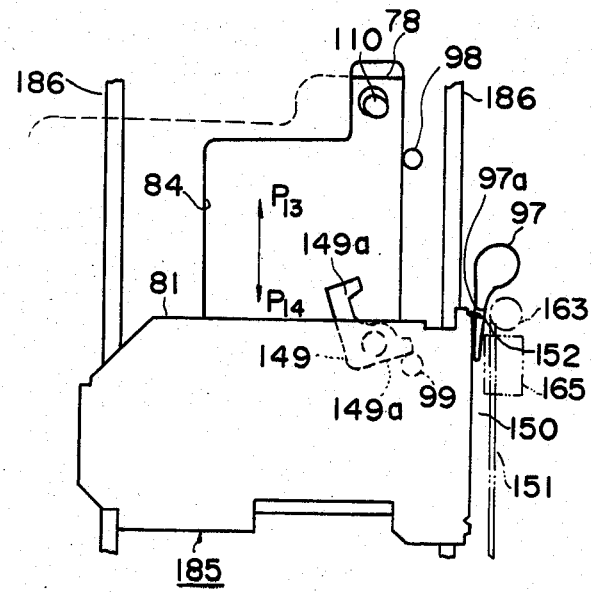

In the above described operation, when the holder 79 has reached its lowermost position, the engaging portion 97a of the actuator 97 engages in the read-out position detection recess 153 of the cam 150 as shown in FIG. 14c. The circuit of the head position detection switch 165 thereupon is switched to reversely rotate the feed loading motor 162 by operation of a control circuit (not shown). The head device 185 thereupon is moved in the direction of the arrow P14. Since at this time the hook portion 149a of the hook 149 is disengaged from the carrier pin 110, the carrier 78 is left in the position shown in FIG. 14c. As the head device 185 is moved in the direction of the arrow P14 and the engaging portion 97a of the actuator 97 engages in the read-in position detection recess 152 of the cam 150 as shown in FIG. 14d, the head position detection switch 165 is switched to turn off the feed loading motor 162. The pickup head 82 therefore is placed in the read-in position. When the head device 185 moves in the state in which the disc magazine case 40 is held playably in the main body 41, the signal reading portion 82a of the pickup head 82 moves beneath the laser beam slot 66 of the disc magazine case 40.

In the above described state in which the head position detection switch 165 has detected the read-in position, a playback command is issued by a control circuit (not shown). The disc driving motor 160 thereby is switched on to rotate the turntable 161 and therefore the disc 42. The signal reading portion 82a of the optical head 82 reads signals recorded on the disc 42 through the laser beam slot 66 so that the disc 42 is played. The feed loading motor 162 is turned on each time the tracking servo by a system including a tracking mirror has reached its limit moving the pickup head 82 by a predetermined distance in the direction of the arrow P13.

Figure 14E:
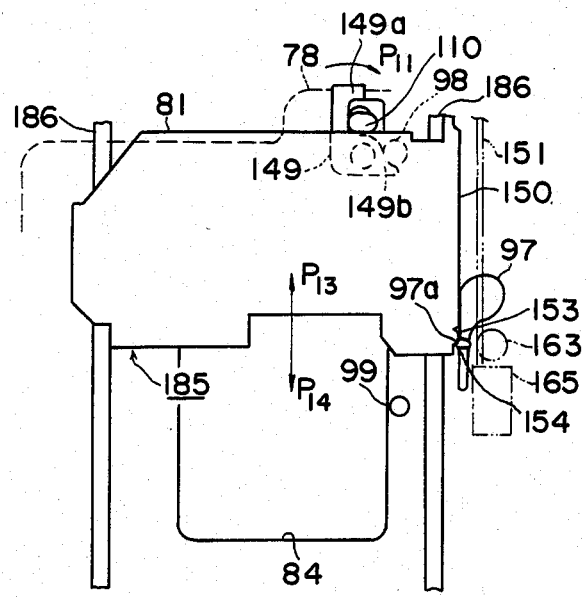
Figure 14F:
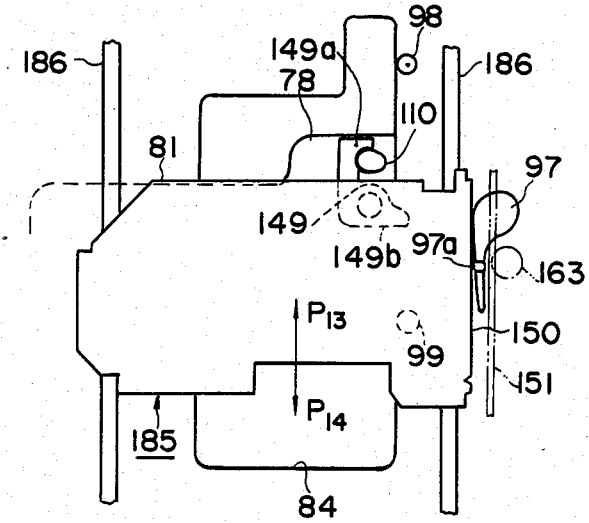

Upon reaching of the pickup head 82 to a last track position of the disc 42, the playback of the disc 42 is completed and the engaging portion 97a of the actuator 97 engages in the read-out position detection recess 153 of the cam 150 to switch the head position detection switch 165. A control circuit (not shown) thereupon issues an eject command to rotate the feed loading motor 162 and thereby move the head device 185 in the direction of the arrow P13 as shown in FIG. 14e, causing the optical head 82 to travel overstroke beyond the read-out position. As the head device 185 moves in this manner, the engaging portion 149b of the engaging hook 149 abuts against the engaging pin 98 and is pushed by this engaging pin 98. This in turn causes the engaging hook 149 to rotate in the direction of the arrow P11 to have its hook portion 149a engaged with the carrier pin 110. At this time the engaging portion 97a of the actuator 97 engages in the overstroke detection recess 154 of the cam 150 to switch the head position detection switch 165. As the switch 165 is switched, the feed loading motor 162 is reversely rotated so that the head device 185 starts movement in the direction of the arrow P14. During this movement, the hook portion 149a of the engaging hook 149 is engaged with the carrier pin 110 as shown in FIG. 14f so that the carrier 78 is moved with the head device 185 in the direction of the arrow P14. This causes the holder 79 and the clamper 80 to be lifted and the disc magazine case 40 to be moved in the direction of the arrow P14 in an operation reverse to the previously described loading operation of the disc magazine case 40. Upon returning of the head device 185 to the original position shown in FIG. 14a, the engaging portion 149b of the engaging hook 149 abuts against the engaging pin 99 and is pushed by this engaging pin 99 so that the engaging hook 149 is rotated in the direction of the arrow P12 to disengage the hook portion 149a from the carrier pin 110. Also, the engaging portion 97a of the actuator 97 engages in the read-in position detection recess 152 to switch the head position detection switch 165 and thereby turn off the feed loading motor 165. Since the end portion of the disc magazine case 40 now projects out of the holder 79, the disc magazine case 40 can be taken out by holding the end portion thereof.

In the loading, playing and ejecting operations of the disc 42, the laser beam slot 66 of the disc magazine case 40 is opened and closed in the following manner.

Figures 15A, 15B:
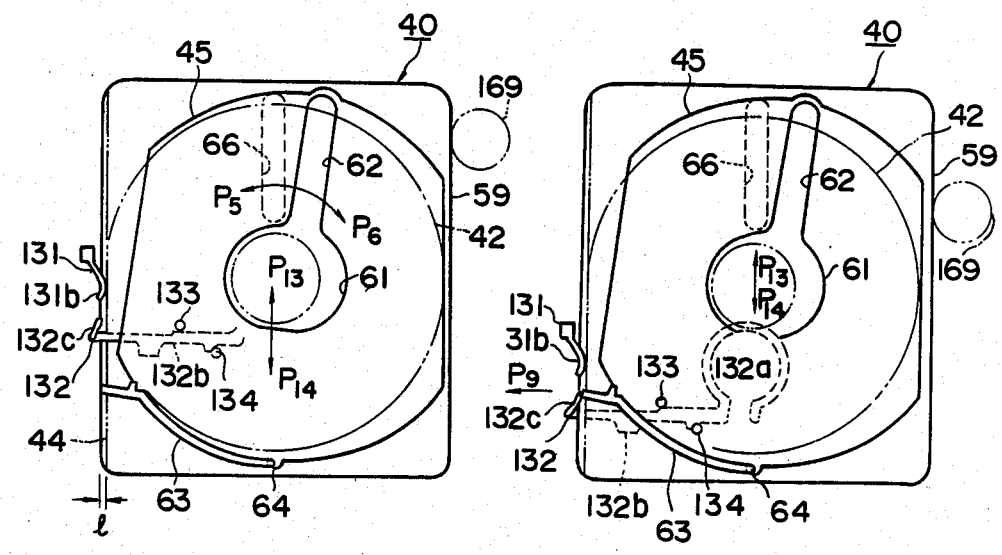
Figures 15C, 15D:
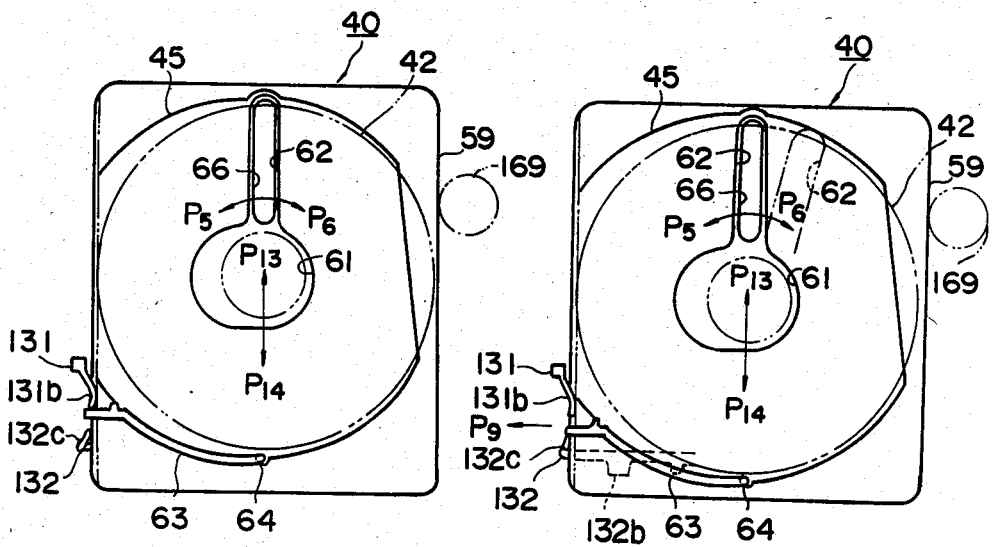

In the initial stage of the loading operation in which the disc magazine case 40 has been inserted in the holder 79, the laser beam slot 66 is closed by the shutter plate 45 as shown in FIG. 15a, since the shutter plate 45 is in a state in which it has rotated about the pin 64 in the direction of the arrow P6. As the disc magazine case 40 has moved in the direction of the arrow P13 by a predetermined distance, the tip portion of the shutter lever 63 rides over the engaging portion 132c of the closing hook 132 as shown in FIG. 15b. At this time the engaging portion 132c and the linear portion 132b of the closing hook 132 are displaceable in the direction of the arrow P9 due to the elastic deformation of the curved portion 132a and permits passing of the shutter lever 63 while the engaging portion 132c is in abutting engagement with the shutter lever 63. After passing of the shutter lever 63, the closing hook 132 returns to the original position by elastic restoration of the curved portion 132a. In this movement, the linear portion 132b can move linearly in the direction of the arrow P9 being guided by the pin 133 and does not flex in the direction of the arrow P13. As the disc magazine case 40 moves further in the direction of the arrow P13, the tip portion of the shutter lever 63 abuts against the engaging portion 131b of the opening hook 131 as shown in FIG. 15c and, as the disc magazine case 40 moves further in the direction of the arrow P13, the shutter plate 45 is rotated in the direction of the arrow P5 so that the slot 62 is brought into register with the laser beam slot 66 so that the laser beam slot 66 is opened. In the above described manner, the disc magazine case 40 ceases its movement in the direction of the arrow P13 at the time point at which the laser beam slot 66 has been opened and thereafter is lowered on the turntable 61 and placed in the playback position.

In the ejecting operation of the disc magazine case 40, the disc magazine case 40 is moved in the direction of the arrow P14 as shown in FIG. 15d. The tip portion of the shutter lever 63 engages with the engaging portion 132c of the closing hook 132 and this causes the shutter plate 45 to be rotated in the direction of the arrow P6 to close the laser beam slot 66. As the disc magazine case 40 further moves in the direction of the arrow P14, the shutter lever 63 rides over the engaging portion 132c of the closing hook 132. At this time, the closing hook 132 moves in the direction of the arrow P9 with its curved portion 132a being elastically deformed. Thus the disc magazine case 40 is restored to the original position in a state in which the laser beam slot 66 is closed.

Since, as described above, the closing hook 132 among the hooks 131 and 132 engaging with the shutter lever 63 can move in the direction of the arrow P9, loading of the disc magazine case 40 can be carried out without trouble even in a case where the disc magazine case 40 is inserted in a state in which the laser beam slot 66 of the disc magazine case 40 is opened.

Figure 16A:
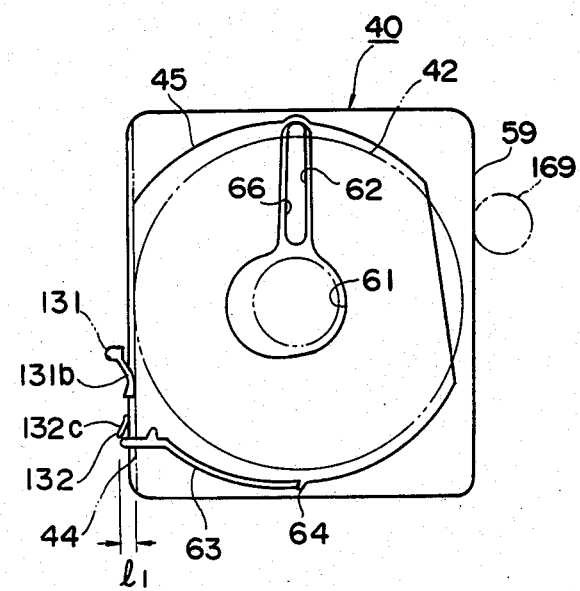

If the laser beam slot 66 of the disc magazine case 40 is opened, the tip portion of the shutter lever 63 projects, as shown in FIG. 16a, from the magazine frame 44 by a distance $l_1$. This distance $l_1$ is somewhat longer than a distance $l_2$ at the time the laser beam slot 66 is closed as shown in FIG. 15a due to relative positions of the pin 64 about which the shutter lever 63 rotates and the tip portion of the shutter lever 63. If, accordingly, the closing hook 132 was unable to move in the direction of the arrow P9 and fixed in its position, the tip portion of the shutter lever 63 would abut against the engaging portion 132c of the closing hook 132 and would be prevented from further movement when the disc magazine case 40 has been inserted with the laser beam slot 66 being opened whereby the loading of the disc magazine case 40 would be impossible.

Figure 16B:
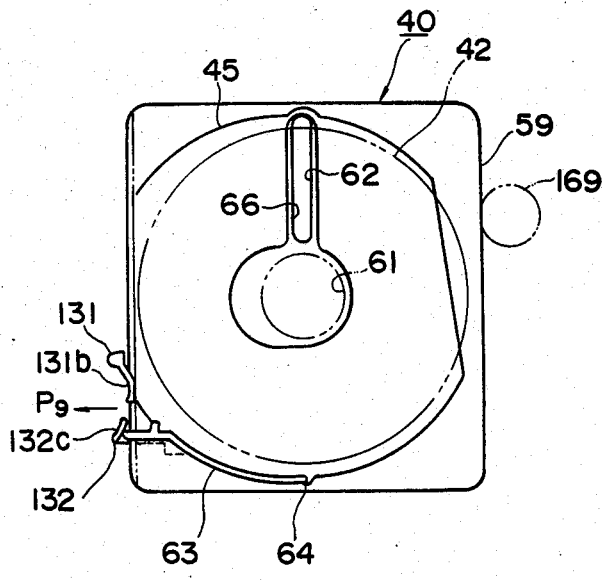
Figure 17:
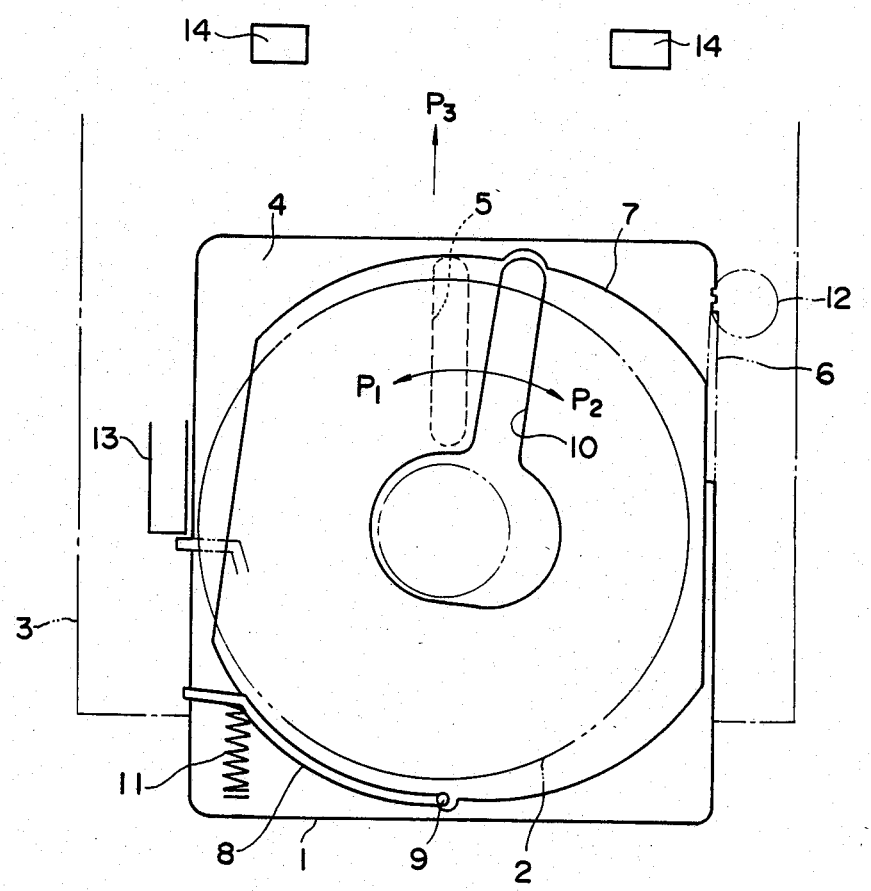
FIG. 17 is a plan view of an essential portion of the prior art disc playback device.

In the device according to the invention, even if the disc magazine case 40 is inserted with the laser beam slot 66 being opened, the closing portion 132c of the closing hook 132 is displaced in the direction of the arrow P9 against the tip portion of the shutter lever 63 which projects by a distance $l_2$ as shown in FIG. 16b so that the loading operation can be smoothly effected.

What is claimed is:

1. A shutter plate control device in a disc playback device including a disc magazine case housing a disc and a main body having a loading device for loading this disc magazine case from an eject position to the main body and ejecting the disc magazine case from the main body to the eject position comprising:
   an aperture formed in the disc magazine case for exposing the disc housed in the disc magazine case to a pickup head;
   a shutter plate provided in the disc magazine case for opening and closing said aperture;
   a shutter lever provided on the shutter plate;
   an opening member provided in the main body and engaging with the shutter lever in loading of the disc magazine case to move the shutter plate in a direction for opening the aperture; and
   a closing member provided in the main body and engaging with the shutter lever in loading of the disc magazine case to be displaced by the shutter lever and thereby permit the shutter lever to pass by without moving the shutter plate while engaging with the shutter lever in ejecting of the disc magazine case to move the shutter plate in a direction for closing the aperture.

2. A shutter plate control device as defined in claim 1 wherein the closing member has an elastically deformable portion and the displacement of the closing member upon engagement with the shutter lever in loading of the disc magazine case is made by deforming of this elastically deformable portion.

3. A shutter plate control device as defined in claim 2 wherein the shutter plate is rotatably supported in the disc magazine case and the aperture in the disc magazine case is opened and closed by rotation of the shutter plate.

4. A shutter plate control device as defined in claim 3 wherein axis of rotation of the shutter plate is offset from the center of the shutter plate and an operating part of the shutter lever for opening and closing the aperture is formed in the vicinity of the axis of rotation of the shutter plate.

5. A shutter plate control device as defined in claim 4 wherein the shutter plate is formed with an opening of a substantially elliptical shape through which a turntable provided in the main body for rotating the disc is inserted and a slot through which the pickup head accesses a portion of the disc on which data is recorded.

6. A shutter plate control device as defined in claim 5 wherein the disc magazine case is formed in its side with a groove extending in the moving direction of the disc magazine case, the operating part of the shutter lever is located in the groove and the opening and closing member move relatively in the groove.

* * * * *